United States Patent [19]

Heidenreich et al.

[11] Patent Number: 4,661,083
[45] Date of Patent: Apr. 28, 1987

[54] MULTIPLE DISC TORQUE LIMITING CLUTCH

[75] Inventors: David C. Heidenreich, Akron; Keith A. Nichols, Canton, both of Ohio

[73] Assignee: Power Transmission Technology, Inc., Copley, Ohio

[21] Appl. No.: 733,136

[22] Filed: May 9, 1985

[51] Int. Cl.[4] .................. F16D 7/02; F16D 13/72; F16F 1/06

[52] U.S. Cl. .................. 464/17; 464/48; 188/71.6; 188/264 A; 267/169; 192/56 R; 192/30 W; 192/70.12; 192/70.27

[58] Field of Search .................. 192/89 R, 70.27, 55, 192/70.12, 30 W, 107 M, 113 A, 56 R; 464/48, 41, 17; 188/71.6, 264 A; 267/169, 170, 61 R, 71

[56] References Cited

U.S. PATENT DOCUMENTS

| | | | |
|---|---|---|---|
| 833,839 | 10/1906 | King | 464/48 |
| 1,017,762 | 2/1912 | Jones | 192/89 R |
| 1,034,845 | 8/1912 | Taylor et al. | 192/89 R |
| 1,063,998 | 6/1913 | Morse | 192/89 R |
| 1,171,173 | 2/1916 | Coppage | 192/89 R |
| 1,339,047 | 5/1920 | Vincent | 192/70.27 |
| 1,771,008 | 2/1916 | Utz | 192/70.27 |
| 1,910,084 | 5/1933 | Bixby | 192/70.27 |
| 2,375,050 | 5/1945 | Tauscher | 267/170 X |
| 2,382,570 | 8/1945 | Kraft | 188/71.6 |
| 2,977,779 | 4/1961 | Steinke et al. | 464/48 |
| 3,236,347 | 2/1966 | Puls et al. | 192/70.27 |
| 3,399,879 | 9/1968 | Hojo et al. | 267/71 X |
| 3,730,304 | 5/1973 | Buyze | 192/113 A |
| 3,732,953 | 5/1973 | Huet | 188/71.6 |
| 4,615,507 | 10/1986 | Rousset et al. | 267/170 X |

FOREIGN PATENT DOCUMENTS

| | | | |
|---|---|---|---|
| 0197804 | 4/1978 | France | 192/30 W |
| 0536571 | 12/1955 | Italy | 267/170 |
| 0250309 | 4/1926 | United Kingdom | 464/48 |

Primary Examiner—Allan D. Herrmann
Assistant Examiner—Martin G. Belisario
Attorney, Agent, or Firm—Oldham, Oldham & Weber Co.

[57] ABSTRACT

A multiple disc torque limiting clutch is presented. A stack of friction discs are splined to an output hub with a stack of separator discs interposed therebetween and keyed to a housing. Spring cup assemblies are positioned through openings in the separator discs to urge the separator discs into forceful contacting engagement with the friction discs. The spring cup assemblies include a compressed helical spring maintained within a cylindrical member and transmitting the spring force through the cylindrical member against the stack of separator and friction discs. The housing elements are of substantially unitary construction, with no relative movement capable therebetween. A wear indicator passes through the housing and indicates the degree of wear of the disc elements, while clearances between the interior of the clutch and the exterior are maintained at a minimum to provide a substantially explosion proof unit.

23 Claims, 1 Drawing Figure

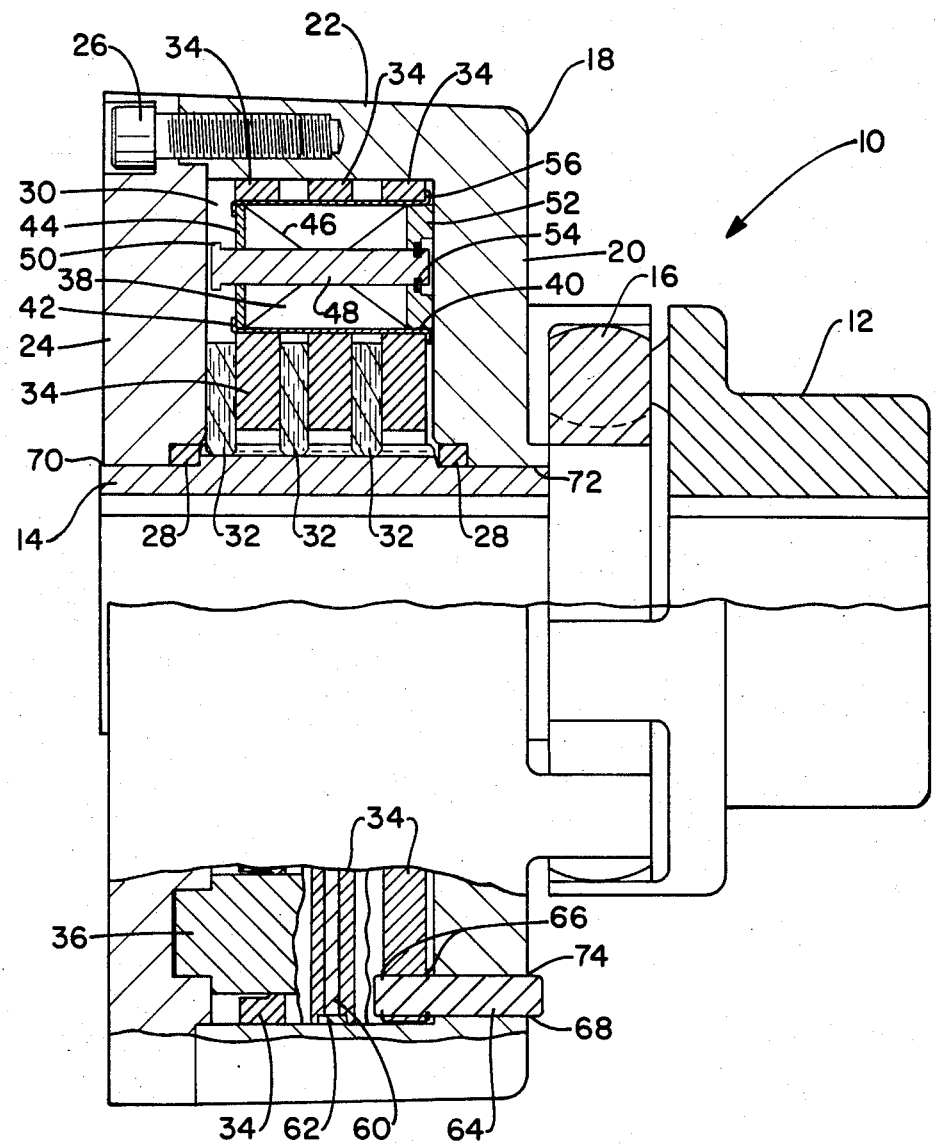

MULTIPLE DISC TORQUE LIMITING CLUTCH

TECHNICAL FIELD

The invention herein resides in the art of power transmission devices. More particularly, the invention relates to a torque limiting clutch wherein multiple friction discs are employed.

BACKGROUND ART

Heretofore numerous types of torque limiting clutches have been known. Typically, such clutches are physically large devices and necessarily so to achieve the capability of transferring force or torque below a certain threshold level, while limiting torque transmission by slippage or the like above such threshold. Previously, the size and complexity of the torque limiting clutch has been a direct function of the characteristic torque of the clutch.

Applicant presents that the state of the art in torque limiting clutches is best shown in his own prior U.S. Pat. No. 4,401,426 and the disclosure of co-pending patent application Ser. No. 346,296, filed Feb. 5, 1982, as a continuation-in-part of the aforementioned patent. As related to this application, such prior art teaches the use of spring bolt assemblies and spring pin assemblies in a torque limiting clutch. Such spring assemblies allow for ease of assembly while providing consistent characteristic torque over the wear life of the clutch. They further provide for a tamper-proof assembly.

Torque limiting clutches typically are of a single disc construction, requiring large friction plates to achieve the desired characteristic torque, greatly increasing the size, mass, and manufacturing cost, all to the detriment of the user. Known torque limiting clutches are also susceptible to degradation by heat build up and may cause fire or explosion when operated in volatile environments.

SUMMARY OF THE INVENTION

In light of the foregoing, it is a first aspect of the invention to provide a multiple disc torque limiting clutch wherein a stack of friction discs are employed, reducing the size, mass, and output inertia of the assembly.

Another aspect of the invention is the provision of a multiple disc torque limiting clutch including means for dissipating heat from the friction discs to the housing.

Still a further aspect of the invention is the provision of a multiple disc torque limiting clutch which is explosion proof.

Yet an additional aspect of the invention is the provision of a multiple disc torque limiting clutch wherein spring-loaded cylindrical members urge friction members into contacting engagement.

The foregoing and other aspects of the invention which will become apparent as the detailed description proceeds are achieved by a torque limiting clutch, comprising: first and second plates interconnected in spaced relationship to each other, and defining a cavity therebetween; a plurality of friction discs maintained within said cavity; a plurality of separator discs alternatingly interposed between said friction discs, each of said separator discs having an opening passing therethrough in registration with said openings of each of said other separator discs; and spring means passing through said openings for urging said separator discs and said friction discs into contacting engagement with each other.

DESCRIPTION OF DRAWING

For a complete understanding of the aspects, techniques, and structure of the invention reference should be had to the following detailed description and accompanying drawing wherein there is shown a multiple sectional view of the inventive structure.

DETAILED DESCRIPTION OF PREFERRED EMBODIMENT

Referring now to the drawing, it can be seen that a multiple disc torque limiting clutch is sectionally shown and designated generally by the numeral 10. In standard fashion, an input hub 12 and an output hub 14 are operationally interconnected by the torque limiting clutch assembly 10. As is known in the art, such a structure is provided to couple torque or force from the input hub 12 to the output hub 14 under normal operating conditions and to slip or otherwise control such torque transfer under abnormal conditions.

A flexible coupling 16 or other suitable means is employed to interconnect the input hub 12 with the housing 18. A first portion of the housing 18 comprises a drive plate portion 20 having a circumferential or ring portion 22 normally extending therefrom. Effectively, the housing 18 is bowl-shaped. While the housing 18 might comprise two separate pieces 20,22 it is preferred that the drive plate portion 20 and the circumferential portion 22 be of unitary construction.

An end plate 24 sealingly engages the circumferential portion 22 by means of clamping bolts 26 circumferentially spaced about the edge of the plate 24. Of course, any suitable type of clamping means could be employed, so long as secured engagement is attained.

Bearings 28 are interposed between the output hub 14 and the drive plate 20 and end plate 24 as shown. The bearings 28 allow for relative rotational movement of the assemblage 18–24 upon the output hub 14 in a manner to be discussed hereinafter.

The assemblage 18–24, mounted upon the output hub 14, defines a ring-like cavity 30. Received within the cavity 30 are a plurality of friction discs 32 splined to the output hub 14 and movable therewith. In somewhat standard fashion, the friction discs 32 may axially move with relation to the output hub 14 by virtue of the splined engagement, but may only rotate with the output hub 14. In like manner, separator discs 34 are secured to and rotatable with the assemblage 18–24 by the interposition of torque pins 36 passing therethrough and being received within a receptacle in the plates 20,24. Preferably, at least two torque pins 36 are provided in circumferentially equally spaced relationship to each other. As shown, the torque pins 36 pass through holes in each of the separator discs 34, the holes in each such separator disc being in registration with each other. While the drawing shows the torque pin 36 received within a hole or receptacle in the end plate 24, it will be understood that the opposite end of the pin 36 is similarly received by the plate 20. The multiple sectional view of the drawing does not show such engagement.

A particularly novel feature of the invention is the provision of a plurality of spring cup assemblies 38 received within registered holes or openings within the separator discs 34. One such spring cup assembly 38 is shown in the drawing, but it will be understood that a plurality of such assemblies will be maintained in registered holes or openings about the periphery of the separator discs 34. The assemblies 38 will be maintained in evenly spaced relationship with each other both circumferentially and radially with respect to the discs 34. As will become apparent hereinafter, the number of such spring cup assemblies 38, typically three or more, will significantly contribute to the characteristic torque of the clutch 10 by establishing the forceful engagement between the separator discs 34 and the friction discs 32. It should also be noted that the working surfaces between the discs 32,34 is radially inward of the positioning of the assemblies 38, the discs 32 being of a substantially smaller diameter than the discs 34, and terminating short of the positioning of the assemblies 38.

Each of the spring cup assemblies 38 includes a spring cup or cylindrical member 40 having an inwardly turned flange 42 at one end thereof for engaging an annular end cap 44. The end cap 44 is urged by a helical spring 46 against the flange 42. A pin 48, preferably unthreaded, is received through a centrally positioned hole in the annular end cap 44 and has a head 50 positioned on the side of the end cap 44 opposite that of the spring 46. A second end cap 52 is received in the opposite end of the cylindrical member or spring cup 40 such that the spring 46 is maintained between the two end caps 44,52. It will be noted that a snap ring or keeper 54 is maintained within a groove near the end of the pin 48 opposite the head 50 and secures a shoulder or groove in the end cap 52. Accordingly, the spring 46, maintained about the pin 48, is restrained between the end caps 44,52 by means of the head 50 and snap ring 54.

The spring cup assemblies 38 are easily assembled. As is presented generally in the aforementioned patent and more particularly in the aforementioned co-pending patent application, a spring pin assembly may be readily constructed. The end cap 44 is placed over the pin 48 to rest upon the head 50. The spring 46 is then positioned over the pin 48 and precompressed by the application of force to the end cap 52 which is then placed over the end of the pin 48. The spring is compressed such that access may be made to the groove in the end of the pin 48 for placement of the snap ring 54. There is thus obtained a spring pin assembly comprising the centrally positioned pin 48 with a precompressed helical spring 46 maintained thereabout and between the end caps 44,52. This spring pin assembly is then simply inserted into the cylindrical member 40 for positioning within the openings of the separator discs 34.

As mentioned above, the number and precompressed force of the spring cup assemblies 38 determines the characteristic torque of the clutch 10. Of course, the alternating stack of separator discs 34 and friction discs 32 have already been positioned. The torque pins 36 are inserted and the end plate 24 is then secured to the circumferential ring portion 22 by means of the clamping bolts 26. Tightening of the clamping bolts 26 draws the end cap 52 into the cylindrical member 40, further compressing the spring 46 and thereby generating a spring force against the end cap 44. The pin 48 extends through the annular opening of the end cap 44 such that the head 50 extends as shown in the drawing. Once the clamping bolts 26 are all tightened to a home position, the characteristic torque of the clutch is established.

It will be noted that an outwardly turned flange 56 engages the right-most separator disc 34 as shown in the drawing. The force of the spring 46 against the end cap 44 is transmitted via the inwardly turned flange 42 through the body of the cylindrical member 40 to the outwardly turned flange 46 and against this separator disc 34. Accordingly, the force of the spring 46 is imparted to the stack of friction discs 32 and separator discs 34 to establish the characteristic torque. Once the clamping bolts 26 are homed, the characteristic torque is established and cannot be easily tampered with or altered.

In standard fashion, so long as the characteristic torque is not exceeded, the torque imparted to the input hub 12 will be transmitted through the stack 32,34 to the output hub 14. If the input torque exceeds the characteristic torque of the clutch 10, the frictional force between the discs 32,34 will be exceeded and the separator discs 34 will be able to rotate with respect to the friction discs 32. Accordingly, the plates 20,24, pinned to the separator discs 34, will be able to rotate upon the bearings 28, achieving the torque limiting characteristic.

A further novel feature of the invention is the provision of a plurality of copper rods 60, radially extending like spokes through bores in each of the separator discs 34. The copper rods or spokes 60 each engage a copper ring 62 which is circumferentially maintained about the edge of each of the separator discs 34 as shown. Copper is preferred as the material for the elements 60,62 for its good heat conductive characteristics, but other heat conducting materials might be employed. In any event, the copper ring 62 makes good contacting engagement with the inner surface of the circumferential portion 22 to provide a heat conductive path to the housing 18-24. Accordingly, frictional heat generated by relative slipping between the plates 32,34 is dissipated to the housing which acts as a heat sink. Degradation or destruction of the stack 32,34 is thus avoided and the life of the clutch 10 prolonged.

Also provided as a portion of the invention is a wear indicator pin 64 which passes through an opening in the right-most separator disc 34 as shown in the drawing and is maintained therein by snap rings 66. The pin 64 passes through an opening 68 in the drive plate 20. As the discs 32,34 wear, the spring cup assemblies 38 urge the disc stack 32,34 to the left as shown in the drawing, drawing the wear indicator pin 64 further into the opening 68. The pin 68 is of such design that when its head is flush with the outer surface of the drive plate 20, such condition indicates maximum wear life of the disc stack 32,34, requiring replacement of the discs.

As presented above, the entire housing of the clutch 10 is preferably of only two parts. Further, there is no relative movement between the end plate 24 and the housing member 18-22 and extremely tight clearances are maintained at the points 70,72 between the plates 24,20 and the output hub 14. The actual radial clearance between the plates 20,24 and the output hub 14 is preferably less than 0.002-0.003 inch, while the axial length of such clearances is preferably 1.0-1.5 inch. The radial clearance and the axial clearance accordingly provide a very tight path from the cavity 30 to the ambient. The flame path from the interior of the clutch 10 to the ambient is thus very restricted. The same tight tolerances are maintained with respect to the clearance 74 of the wear indicator pin 64. Accordingly, with a substantially unitary construction of the housing and tight flame paths from the interior of the clutch 10 to the exterior, the assembly 10 is substantially explosion proof. By the term "explosion proof," it is intended that if the assembly is operating in an environment of volatile or flammable gases and if such gases were to be within the clutch housing at a time of clutch slippage and if such slippage were to generate temperatures high enough to cause ignition of the gases, the resulting explosion would be contained within the clutch housing and no flames would escape the housing.

Thus it can be seen that the objects of the invention have been satisfied by the structure presented hereinabove. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be had to the following claims.

What is claimed is:

1. A torque limiting clutch, comprising:
   first and second plates interconnected in spaced relationship to each other, and defining a cavity therebetween;
   a plurality of friction discs maintained within said cavity;
   a plurality of separator discs alternatingly interposed between said friction discs, each of said separator discs having an opening passing therethrough in registration with said openings of each of said other separator discs; and
   spring means passing through said openings for urging said separator discs and said friction discs into contacting engagement with each other, said spring means comprising a tubular member passing through said openings and engaging at least one of said separator discs, said tubular member receiving a spring maintained in a precompressed state by a pin, said spring being located between first and second end caps respectively located at first and second ends of said pin, said end caps being located within said tubular member.

2. The torque limiting clutch as recited in claim 1 wherein said tubular member has an outwardly turned flange at a first end thereof, said flange engaging at least one of said separator discs.

3. The torque limiting clutch as recited in claim 2 wherein said tubular member is cylindrical.

4. The torque limiting clutch as recited in claim 1 wherein said spring means is maintained within said tubular member.

5. The torque limiting clutch as recited in claim 4 wherein said first end cap engages and encloses a first end of said tubular member and wherein said first end of said pin extends through said first end cap, such extension decreasing as said friction discs wear.

6. The torque limiting clutch as recited in claim 5 wherein said second end cap is urged against said first plate.

7. The torque limiting clutch as recited in claim 1 wherein said separator discs are fixedly secured to said first and second plates by at least one torque pin.

8. The torque limiting clutch as recited in claim 1 wherein said first and second plates are fixedly interconnected to each other.

9. The torque limiting clutch as recited in claim 8 wherein said first and second plates are maintained upon a hub, said cavity communicating with the ambient through a passageway between said plates and said hub, said passageway having height of less than 0.002-0.003 inch and a length of 1.0-1.5 inch.

10. The torque limiting clutch as recited in claim 1 wherein said separator discs make circumferential contacting engagement with a ring portion interconnecting said plates.

11. The torque limiting clutch as recited in claim 10 wherein said separator discs include spokes extending radially through said separator discs to the circumferential periphery thereof.

12. The torque limiting clutch as recited in claim 11 wherein said separator discs further include a ring passing about the circumference thereof, said ring being interconnected with said spokes.

13. The torque limiting clutch as recited in claim 12 wherein said spokes and ring are of copper material.

14. The torque limiting clutch as recited in claim 1 wherein said first and second plates are maintained upon a hub and further including means interposed between said plates and said hub for allowing relative rotational movement of said plates upon said hub.

15. The torque limiting clutch as recited in claim 14 wherein said means interposed between said plates and said hub comprises bearings.

16. A torque limiting clutch, comprising:
    a housing defining a cavity therein;
    a stack of alternating friction discs and separator discs maintained within said cavity, said separator and friction discs being relatively rotatable with respect to each other;
    a plurality of spokes extending radially through each of said separator discs to circumferential surfaces thereof; and
    a ring passing about said circumferential surface of each said separator discs and interconnecting said spokes of the associated separator discs, said ring being in contacting engagement with said housing.

17. The torque limiting clutch as recited in claim 16 wherein said spokes and ring are of copper construction.

18. The torque limiting clutch as recited in claim 16 wherein said housing comprises a bowl-shaped member having an annular plate rigidly secured to and enclosing one end thereof.

19. The torque limiting clutch as recited in claim 18 wherein said housing is maintained upon an output hub, and wherein clearances are maintained between said housing and said output hub, said clearances having a height of 0.002-0.003 inch and an length of 1.0-1.5 inch.

20. The torque limiting clutch as recited in claim 16 which further includes a walled member passing through said separator discs, said walled member receiving a spring member therein, said spring member urging against said housing.

21. The torque limiting clutch as recited in claim 20 wherein said walled member engages at least one of said separator discs, said spring member imparting a spring force to said stack of discs through said walled member.

22. The torque limiting clutch as recited in claim 21 wherein said walled member is cylindrical, having an outwardly turned flange at one end thereof, said flange engaging said one of said separator discs.

23. The torque limiting clutch as recited in claim 16 which further includes a wear pin extending through said housing and in engagement with one of said separator discs.

* * * * *